United States Patent [19]
Prasad et al.

[11] 3,944,946
[45] Mar. 16, 1976

[54] COHERENT GENERATION OF MICROWAVES BY STIMULATED RAMAN EMISSIONS

[76] Inventors: Balram Prasad, 56 William St., West Newton, Mass. 02165; Clare C. Leiby, Jr., 229 Oil Billerica Road, Bedford, Mass. 01730

[22] Filed: Nov. 15, 1974

[21] Appl. No.: 524,170

[52] U.S. Cl. ............ 331/94; 313/231.6; 315/111.9; 325/101
[51] Int. Cl.² .......................................... H03B 17/00
[58] Field of Search .................... 331/94; 313/231.6; 315/111, 111.8, 111.9; 250/396, 492, 493, 503; 325/101, 105

[56] References Cited
UNITED STATES PATENTS
2,712,069  6/1955  Goldstein .............................. 331/94

FOREIGN PATENTS OR APPLICATIONS
729,676  5/1955  United Kingdom .................. 331/94

Primary Examiner—John Kominski
Attorney, Agent, or Firm—Joseph E. Rusz; Sherman H. Goldman

[57] ABSTRACT

The generation of controlled, electromagnetic, coherent, microwave radiation from a warm, uniform plasma at approximately twice the plasma frequency by means of a source of high energy electrons being directed into a plasma and coupling the resultant energy from a cavity resonator to external circuitry.

4 Claims, 2 Drawing Figures

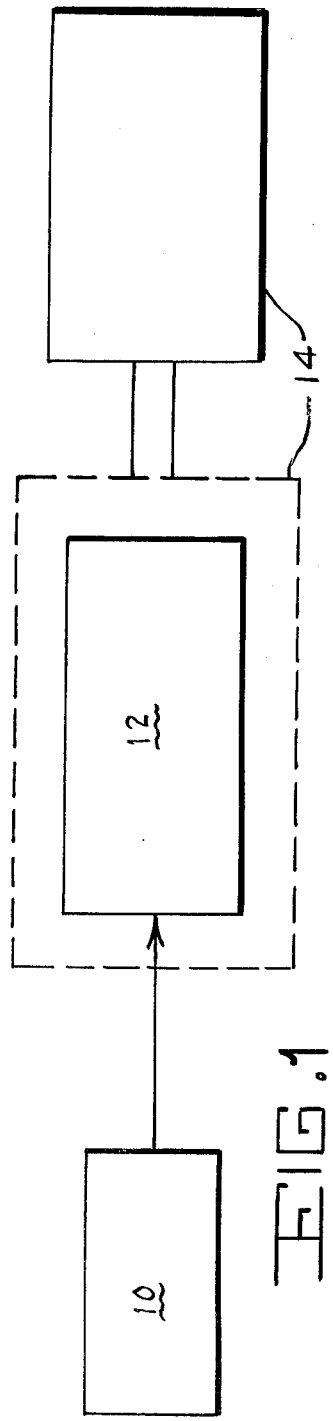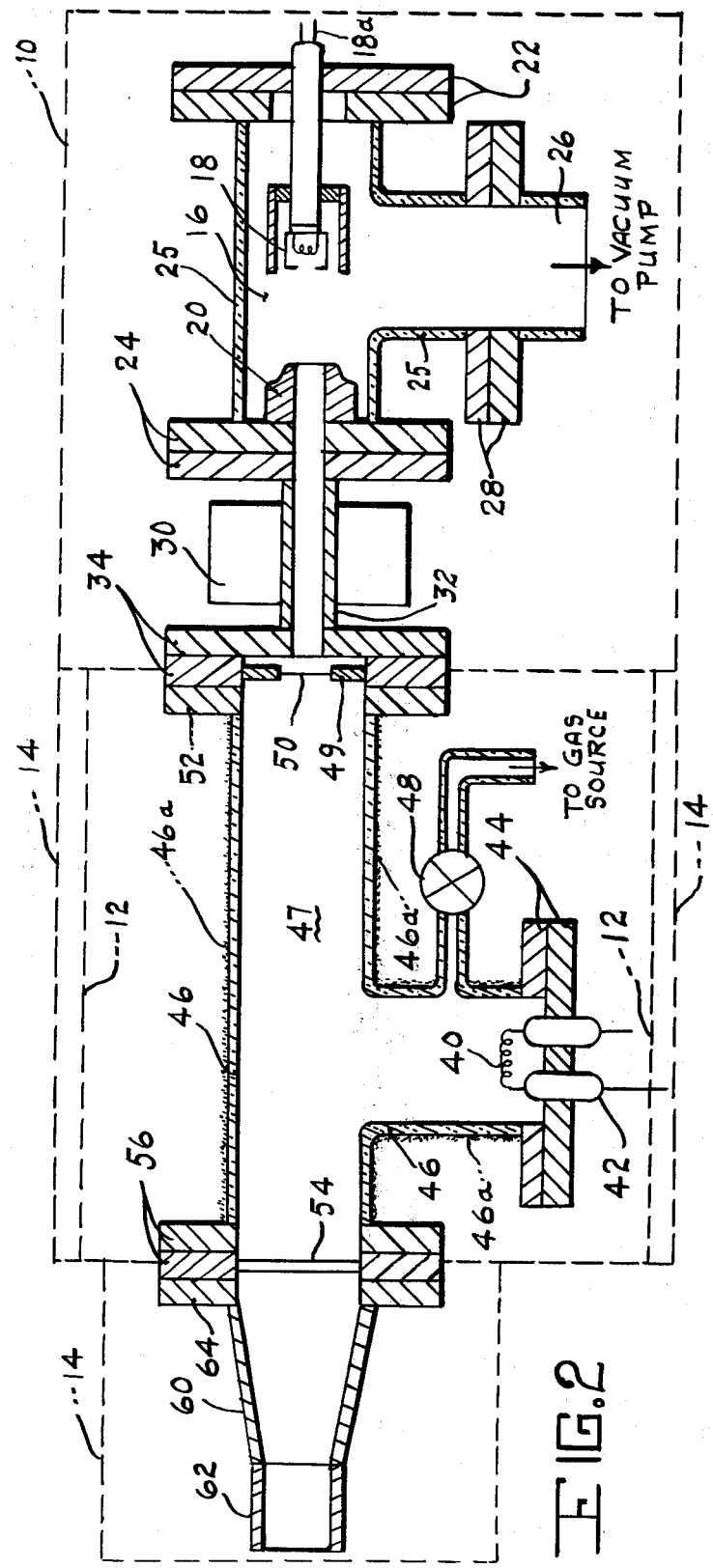

COHERENT GENERATION OF MICROWAVES BY STIMULATED RAMAN EMISSIONS

STATEMENT OF GOVERNMENT INTEREST

The invention described herein may be manufactured and used by or for the Government for governmental purposes without the payment of any royalty thereon.

BACKGROUND OF THE INVENTION

This invention relates generally to microwave, electromagnetic radiation and more particularly to a method and apparatus for producing controlled, coherent microwave radiation from a warm, uniform plasma at approximately twice the plasma frequency.

Previously, experimental evidence and research had indicated that warm, uniform plasma was capable of incoherent radiated power caused by scattering of plasma waves by density fluctuations. Further, when longitudinal electrostatic waves are excited in the plasma, the attendant scattering, known as Rayleigh scattering, consists of two components (a) a strong longitudinal electrostatic component which remains in the plasma volume and (b) a comparatively weak, transverse, electromagnetic component, a part or all of which radiates out of the plasma. Also noted has been the phenomenon known as Raman scattered waves, which are transverse, electromagnetic; however, they are much weaker than the transverse Rayleigh scattered component. We have discovered the means for controlling Raman scattered components by intensifying the energy density of the Rayleigh scattered longitudinal wave above a certain threshold value. The Raman scattering under these conditions becomes stimulated rather than spontaneous and is amplified coherently to yield intense radiation from the plasma. This process although vaguely similar, is not an exact analogy to the quantum stimulated Raman emission process.

SUMMARY OF THE INVENTION

The invention is a technique and apparatus for producing controlled, coherent, microwave, electromagnetic radiation from a warm, uniform plasma at approximately twice the frequency of the plasma by directing high energy electrons into a plasma and providing means for coupling the energy to appropriate circuitry.

Accordingly, it is a primary object of this invention to provide a method and apparatus for producing electromagnetic energy of a controlled nature to radiate from a plasma.

It is another object of this invention to provide a technique and apparatus for producing electromagnetic radiation at approximately twice the plasma frequency.

It is still another object of this invention to provide an apparatus which directs high energy electrons into a plasma and couples the resultant radiated energy at approximately twice the plasma frequency to external circuitry.

It is a further object of this invention to provide electromagnetic radiation by causing the energy density of Rayleigh scattered longitudinal waves to exceed a certain threshold to stimulate Raman scattering.

It is a still further object of this invention to provide for the generation of electrostatic waves within a plasma whereby the amount of electromagnetic power stimulated by Raman scattering increases with the product of the electron beam power and electron beam current.

These and other advantages, features and objects of the invention will become more apparent from the following description taken in connection with the illustrative embodiment in the accompanying drawings.

BRIEF DESCRIPTION OF THE DRAWINGS

FIG. 1 is a block diagram schematically depicting the conceptualization of this invention; and FIG. 2 is a schematic representation of a preferred embodiment.

DESCRIPTION OF THE PREFERRED EMBODIMENT

Referring to FIG. 1 there is shown at 10 a source of directed high energy electrons which may be produced either by a low pressure electrical discharge (to produce a double hump velocity distribution) or by means of an electron beam. This source of directed high energy electrons is applied to a plasma indicated at 12 which may be either discharge generated or electron beam generated. A cavity resonator and coupling to external circuitry is indicated at 14 for obtaining the energy from the system to put it to practical usage. Low frequencies would require conventional electromagnetic cavities, waveguides or coaxial cables while high frequencies could use quasi-optical cavities and either conventional and/or dielectric waveguides.

It is known that the plasma frequency is proportional to the square root of the electron density. Thus, tunable output frequencies may be obtained by varying a strong electron beam or by varying the discharge current density, or both. The preferred embodiment of the conceptualization of FIG. 1 is illustrated in FIG. 2 whereby the source of directed high energy electrons 10 (at the right of the Figure), the plasma 12 and the coupling arrangement at 14 are applied to blocks correlating these components with those of FIG. 1.

The electron beam is utilized to provide the source of directed, high energy electrons and comprises an electron beam generating chamber 16 having therein an electron beam apparatus with a conventional electron beam cathode assembly 18 and a grounded stainless steel electron beam high voltage anode at 20. Forming the chamber are a set of opposed nonmagnetic flanges 22 and 24 which comprise the mounts for the cathode 18 and anode 20, respectively. Between the flange assemblies 22 and 24 are glass walls 25 sealed with epoxy or to Kovar in a conventional manner. An exhaust port 26 is attached by means of nonmagnetic flanges 28 for connection with a vacuum pump. The generated electron beam is focused by means of conventional electrostatic focusing (not shown) or by means of a magnetic beam focusing coil 30 which surrounds a stainless steel or other nonmagnetic cylindrical chamber 32, which is secured between the flange assembly 24 and a flange assembly 34, and also by a focusing coil (not shown) within the anode 20. Power is supplied in any conventional manner to the cathode assembly 18 at 18a for operation of the electron beam generating system. The device, thus far described, is conventional and may be purchased off the shelf from a number of companies, (e.g., the electron beam device may be a Pierce gun). It is desirable to have a good, broad, thick beam which is more dense on the outer portions of the beam to improve plasma uniformity, since the edges of the plasma diffuse to the walls. It should also have sufficient penetrating power to go through the tube or cylinder 32 and through the plasma chamber 47. The electron beam density must be of the order of only a few percent (less than 5%) of the total plasma electron density in order to produce mass and charge inhomogeneities in the plasma to scatter the electrostatic waves to produce electromagnetic radiation. It is also desirable to keep the collision frequency of the electrons from the source and plasma with the plasma constituents low and to pulse the beam generating source to obtain high energy and high densities. The pressure of the gas forming the plasma must produce a collision frequency which is significantly lower than the plasma frequency. Large differences are desirable. The collision frequency must be small in order to avoid damping of the electrostatic (Langmuir) waves.

The electron beam source 10 directs its energy to the plasma at 12 which has a conventional cathode at 40 which may be pulsed or may provide a continuous discharge. Pulsed or continuous power is supplied by means of the wire shown at 42. Nonmagnetic flanges, here shown at 44, provide the mounting for the cathode 40 and the connection with the low loss glass or quartz walls 46 forming the plasma chamber 47. A gas filling valve at 48 connects the chamber with a gas source which may contain any ionizable gas such as argon, neon, etc. The gas should be inert to avoid energy loss and chemical reactions. The plasma utilized must be warm and relatively uniform, i.e., a partially ionized gas consisting of electrons, ions and neutral molecules. In this type of plasma mass and charge density fluctuations give rise to a number of small, locally inhomogenous regions throughout the plasma volume. Each of these regions scatters acoustical, electrostatic and electromagnetic waves spontaneously. The dimensions of the region are of the order of the volume swept out by the characteristic plasma (known as Debye) length. The regions contain large numbers of electrons and ions and are constantly expanding, contracting and rotating to produce a slow vibrational motion of the center of the mass of each region accompanied by faster rotational motion about the center of mass. These two types of periodic motions are at the characteristic ion and electron plasma frequencies, respectively, and are statistically independent in a plasma in dynamic equalibrium. The walls 46 of the chamber may be externally silvered or plated, as shown at 46a, for high frequency applications to form a metallic cavity which acts as a waveguide for the generated microwaves. This may be considered a part of the coupling 14 of FIG. 1 which surrounds the plasma 12. The end of the chamber adjacent the flange assembly 34 of the electron beam source 10 may have a foil mount 49 with a thin, nonmagnetic foil material window 50 therein. The window material may, for example, be of titanium or aluminum foil and would be used to seal the chamber. The window material 50 may be eliminated by utilizing a continuous plasma gas flow with high capacity vacuum pumping at port 26 (e.g., differential pumping which insures a low press in chamber 16 so that an electron beam can be generated). The size of the window opening is small (below "cut-off" for microwave propagation) so that all of the microwave energy is reflected into the chamber. A flange shaped stainless steel element, shown secured to flanges 34, is illustrated at 52 and with the connected elements forms the anode of the plasma chamber. The opposite end of the plasma chamber 47 has a dielectric microwave window at 54 which is supported by a flange assembly 56 to enclose the plasma chamber. The dielectric 54 is chosen to extract the maximum of the microwave energy generated by the plasma even though part of the energy impinging thereon is reflected into the plasma chamber 47.

The cavity resonator formed by the silvering of walls 46 and the coupling to external circuitry is shown at 14 and includes a tapered waveguide transition 60 which is connected with a conventional output waveguide 62. An end flange 64 is secured to flange assembly 56 for joinder of this section with the plasma section 12.

The stimulated electromagnetic output from the system is inversely proportional to plasma electron temperature to the fourth power and is directly proportional to the fourth power of the energy of the nonthermal electron beam component of the electron energy distribution. The output is also proportional to the product of the beam current and the beam power. Since the beam electron density cannot exceed a few percent of the plasma electron density and since the output frequency is proportional to the square root of this latter density, the maximum attainable power output increases as the fourth power of the output frequency.

The ratio of generated power at about twice the plasma frequency to beam power is $$\frac{P(\sim 2f_p)}{P(\text{beam})} = K j_b L_b \alpha^8$$

where
$K$ = a constant = $3.68 \cdot 10^{-20}$
$j_b$ = beam current density (amps/cm$^2$)
$L_b$ = beam length in plasma (cms)
$\alpha$ = ratio of electrostatic wave phase velocity to the mean thermal velocity of the plasma electrons From the foregoing it can be seen that the discharge plasma controls the plasma electron density and hence, the output frequency. The electron beam current density and the plasma electron density controls power output.

The threshold above which the energy density of Rayleigh scattered longitudinal waves is intensified is related to the input density field of plasma waves. The large amplitude of the Langmuir waves is caused by the high pump field (electron beam velocity dispersion). The energy level for plasma oscillation to produce the coherent radiation desired is dependent upon the plasma utilized. This threshold energy level is proportional to the plasma electron temperatures to the third power and is inversely proportional to the plasma electron density. It is also weakly proportional to the ratio of the mean plasma ion thermal velocity to the electron collision frequency in the plasma.

Thus $W$threshold $$\geqslant A m N_e v_{ti}^2 \alpha^{-6} \frac{f_p}{\nu_{eff}}$$

where
$W$ = energy density of electrostatic waves in the plasma
$A$ = constant = 756
$m$ = means of the electron $N_e$ = plasma electron density
$v_{ti}$ = thermal velocity of plasma ions
$v_{eff}$ = effective collision frequency of plasma electrons For a representative argon plasma where the temperature is of the order of 45,000°K and an electron density is the order of $1.6(10)^9$ (electrons/c.c.) and $v_{eff}$ is $1.2(10)^6$/sec., the threshold energy density level is about $6.5(10)^{-5}$ ergs/cms$^3$.

Thus, there has been described a method and apparatus for producing coherent microwave radiation from a warm, uniform plasma at approximately twice the plasma frequency.

Although the invention has been described with reference to particular embodiments, it will be understood to those skilled in the art that the invention is capable of a variety of alternative embodiments within the spirit and scope of the appended claims.

We claim:

1. A method of generating controlled, coherent microwave radiation from a warm, uniform plasma at approximately twice the plasma frequency comprising the steps of
    directing high energy electrons into a plasma to excite longitudinal electrostatic waves in the plasma such that the energy density level of the said waves is sufficient to stimulate transverse electromagnetic wave radiation at approximately twice the plasma frequency and
    coupling said electromagnetic energy for use in appropriate circuitry.

2. A means for producing controlled, electromagnetic, coherent, microwave radiation from a warm, uniform plasma at approximately twice the plasma frequency comprising
    a source of high energy electrons,
    a plasma having its electron density at least twenty times the electron density from said source and coupled to said source for receiving high energy electrons therefrom to produce an electromagnetic wave output, the collision frequency of electrons from said source and said plasma being considerably lower than the plasma frequency to inhibit damping of the electromagnetic wave output and
    means for coupling the stimulated energy from said plasma for its utilization.

3. A device as defined in claim 2 wherein the energy level of plasma oscillation is sufficiently high to cause intensification of microwave radiation from said plasma at approximately twice its plasma frequency.

4. An apparatus for generating controlled coherent microwave radiation from a plasma at twice the plasma frequency comprising
    a source of high energy electrons,
    a plasma,
    means forming a part of said source for directing said electrons into said plasma to excite longitudinal electrostatic waves in said plasma such that the energy density level of said waves is sufficient to stimulate transverse electromagnetic wave radiation at approximately twice the plasma frequency, and
    means for coupling said energy from said plasma.

* * * * *